United States Patent
Fellman et al.

(10) Patent No.: US 7,539,187 B2
(45) Date of Patent: May 26, 2009

(54) SYSTEM AND METHOD FOR LOW-LATENCY CONTENT-SENSITIVE FORWARD ERROR CORRECTION

(75) Inventors: Ronald D. Fellman, San Diego, CA (US); John C. Beer, San Diego, CA (US)

(73) Assignee: Qvidium Technologies, Inc., San Diego, CA (US)

( * ) Notice: Subject to any disclaimer, the term of this patent is extended or adjusted under 35 U.S.C. 154(b) by 686 days.

(21) Appl. No.: 11/184,485

(22) Filed: Jul. 19, 2005

(65) Prior Publication Data

US 2006/0029065 A1 Feb. 9, 2006

Related U.S. Application Data (60) Provisional application No. 60/522,063, filed on Aug. 9, 2004, provisional application No. 60/521,821, filed on Jul. 7, 2004, provisional application No. 60/521,904, filed on Jul. 19, 2004.

(51) Int. Cl.
*H04L 12/28* (2006.01)
*H04L 12/56* (2006.01)

(52) U.S. Cl. ............. 370/389; 370/535; 370/537; 370/242; 714/755

(58) Field of Classification Search .......... 714/752, 714/758, 755; 375/240.28, 500, 505, 521, 375/545, 467, 466, 390, 461; 370/389, 401, 370/468, 498
See application file for complete search history.

(56) References Cited

U.S. PATENT DOCUMENTS

| | | | | |
|---|---|---|---|---|
| 5,870,412 | A * | 2/1999 | Schuster et al. | 714/752 |
| 6,404,818 | B1 * | 6/2002 | Obikane | 375/240.28 |
| 6,487,690 | B1 * | 11/2002 | Schuster et al. | 714/752 |
| 6,681,362 | B1 * | 1/2004 | Abbott et al. | 714/755 |
| 7,047,480 | B2 * | 5/2006 | Kadatch et al. | 714/781 |
| 7,404,001 | B2 * | 7/2008 | Campbell et al. | 709/231 |
| 2004/0003334 | A1 * | 1/2004 | Boyanapalli | 714/752 |

* cited by examiner

*Primary Examiner*—Ricky Ngo
*Assistant Examiner*—David Oveissi
(74) *Attorney, Agent, or Firm*—Dalina Law Group P.C.

(57) ABSTRACT

A forward error correction (FEC) encoding system and method optimized for protecting real-time audio-video streams for transmission over packet-switched networks with minimal latency. Embodiments of this invention provide bandwidth-efficient and low-latency FEC for both variable and constant bit-rate MPEG-encoded audio and video streams. To maximize bandwidth-efficiency and playable frame rate for recovered media streams, embodiments of the invention may sort packets by content type and aggregate them into FEC blocks weighted by sensitivity in the recovered stream to packet loss of a particular content type. Embodiments of this invention may use temporal constraints to limit FEC block size and thereby facilitate their use in the transport of VBR streams.

20 Claims, 5 Drawing Sheets

First 8 bytes of RTP header (RFC 3550)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
```

FIGURE 3b.

First 16 bytes of FEC header

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          SN base              |I|V|     length recovery       |
+-+-+-+-+-+-+-+-+-+-+-+-+-+-+-+-+-+-+-+-+-+-+-+-+-+-+-+-+-+-+-+-+
| N ChkSum |                   mask                             |
+-+-+-+-+-+-+-+-+-+-+-+-+-+-+-+-+-+-+-+-+-+-+-+-+-+-+-+-+-+-+-+-+
|                           mask                                |
+-+-+-+-+-+-+-+-+-+-+-+-+-+-+-+-+-+-+-+-+-+-+-+-+-+-+-+-+-+-+-+-+
|                      timestamp recovery                       |
+-+-+-+-+-+-+-+-+-+-+-+-+-+-+-+-+-+-+-+-+-+-+-+-+-+-+-+-+-+-+-+-+
```

FIGURE 3c.

FEC Packet Structure

```
+-+-+-+-+-+-+-+-+-+-+-+-+-+-+-+-+-+-+-+-+-+-+-+-+-+-+-+-+-+-+-+-+
|                          RTP Header                           |
+-+-+-+-+-+-+-+-+-+-+-+-+-+-+-+-+-+-+-+-+-+-+-+-+-+-+-+-+-+-+-+-+
|                          FEC Header                           |
+-+-+-+-+-+-+-+-+-+-+-+-+-+-+-+-+-+-+-+-+-+-+-+-+-+-+-+-+-+-+-+-+
|                          FEC Payload                          |
|                                                               |
+-+-+-+-+-+-+-+-+-+-+-+-+-+-+-+-+-+-+-+-+-+-+-+-+-+-+-+-+-+-+-+-+
```

SYSTEM AND METHOD FOR LOW-LATENCY CONTENT-SENSITIVE FORWARD ERROR CORRECTION

This application takes priority from United States application to Fellman entitled "LOW-LATENCY CONTENT-SENSITIVE FORWARD ERROR CORRECTION" filed Aug. 9, 2004, Ser. No. 60/522,063 is hereby incorporated herein by reference. United States application to Fellman entitled "METHOD AND SYSTEM FOR PROVIDING SITE INDEPENDENT REAL-TIME VIDEO TRANSPORT OVER PACKET-SWITCHED NETWORKS" filed Jul. 7, 2004, Ser. No. 60/521,821 is hereby incorporated herein by reference. United States application to Fellman entitled "METHOD AND SYSTEM FOR PROVIDING SITE INDEPENDENT REAL-TIME MULTIMEDIA TRANSPORT OVER PACKET-SWITCHED NETWORKS" filed Jul. 7, 2005, Ser. No. 11/177,507 is hereby incorporated herein by reference. United States Provisional Patent Application to Fellman entitled "METHOD FOR CLOCK SYNCHRONIZATION OVER PACKET-SWITCHED NETWORKS" filed Jul. 19, 2004, Ser. No. 60/521,904 is hereby incorporated herein by reference. United States Provisional Patent Application to Fellman entitled "SYSTEM AND METHOD FOR CLOCK SYNCHRONIZATION OVER PACKET-SWITCHED NETWORKS" filed Jul. 19, 2005, Ser. No. 11/184,486 is hereby incorporated herein by reference.

BACKGROUND OF THE INVENTION

1. Field of the Invention

Embodiments of this invention relate generally to the implementation of a packet recovery mechanism for the robust transport of live or real-time media streams over packet-switched networks. Such media streams may consist of an audio and a video component or any combination of audio and video or other time-sensitive signals. The packet-switched network may include Internet connections and IP networks in general. More specifically, such embodiments relate to forward error correction (FEC) mechanisms optimized for robust, low-latency, and bandwidth-efficient transport of audio and video streams over packet-switched networks.

2. Description of the Related Art

Random congestion through packet-switched networks, such as the Internet, adds an unpredictable amount of jitter and packet loss to the transport of video and audio packet streams. Furthermore the most efficient video compression, variable bit-rate (VBR) coding, produces large bursts of data that further add to network congestion, compounding potential router overflow and the resulting packet loss. Thus, the number of packets that a network might drop and the instantaneous packet rate may fluctuate greatly from one moment to the next.

In addition to contending with packet delivery problems, maintaining low latency is a critical constraint for video conferencing and other applications having interaction between the viewer and subject. Some examples of applications where low-latency is critical are: security, where an operator may desire to control the pan/tilt/zoom of a remote camera to follow suspicious activity; and telemedicine, to enable a doctor to remotely diagnose a patient.

Forward Error Correction (FEC) potentially provides a low-latency method for correcting packet loss. FEC adds a fixed percentage of additional packets, called checksum packets, to a block of data packets such that the loss of one or more data packets in the block, within some predetermined bound, can be recovered by combining the checksum packets with those data packets that had been successfully received in order to reconstruct the missing data packets.

Various forms of FEC have long been applied to digital audio-video streams, most notably for satellite transmission and most recently for Internet streaming, to help minimize the adverse impact of channel impairments on the audio-video signal. Advantages of FEC over other error correction mechanisms include scalability to large systems because of its inherent multicast compatibility, and the fact that latency and distance between source and destination does not have any intrinsic effect since FEC does not require feedback.

Forward Error Correction

Variable packet loss rates and variable video bit rates, coupled with the need to minimize latency, present challenges to the implementation of FEC techniques for protecting packetized media streams. FEC augments a media stream with redundant data, called checksum packets, to help restore stream integrity based upon anticipated levels of packet loss. FEC groups data packets into an FEC block. The checksum packets generated from a given block are said to cover that block since missing data packets can be restored by combining the remaining checksum and data packets in that block. FEC coverage, the number of missing data packets that FEC can recover within the same block, is limited to the number of checksum packets within that block.

One of the strengths of FEC is that it has the potential to immediately reconstruct lost data upon receipt of the appropriate checksum packets, without the need to wait for retransmissions from the source. Thus for networks with long round-trip travel times, FEC may significantly reduce latency as compared with feedback-based error correction, such as Automatic Repeat reQuest (ARQ).

However without knowledge of the actual packet loss at the receiver, a transmitter implementing FEC may not provide a sufficient number of checksum packets for packet recovery. Since FEC implementations generally transmit a fixed number of checksum packets, often calculated as a constant percentage of the number of data packets regardless of packet content, such FEC implementations would not be able to efficiently handle large instantaneous variations in packet loss rates. In such cases, either FEC bandwidth overhead would be excessive and inefficient, or else the FEC coverage would be inadequate for complete packet recovery.

Furthermore without knowledge of the instantaneous bit rate, FEC processing at a receiver may wait an indeterminate amount of time for of all checksum packets pertaining to a data block to arrive before recovering lost data from that data block. For example, if every 10 data packets generate one checksum packet to form an FEC block, and a network drops one data packet in delivering this block, then the receiver would have to wait for the arrival of the $10^{th}$ packet, the checksum packet, before it could recover the missing data packet. However under VBR coding of the stream, the time required to receive these 10 packets can vary considerably. Waiting for the checksum packet to arrive delays the stream at the receiver and creates a burst of packets as the receiver accumulates each FEC block for FEC processing. Thus, the burstiness of FEC receiver processing adds jitter, and ultimately latency, to a recovered signal.

FEC also generates burstiness and jitter at a transmitter. As mentioned, standard FEC implementations generate checksum packets as a fixed percentage of the number of outgoing data packets. These implementations wait for all packets in a data block to have been generated before creating and sending the associated checksum packets for the block. As for VBR streams at the receiver, a fixed-percentage FEC checksum generator at the transmitter would also have to wait an indeterminate amount of time for enough data packets to accumulate and fill the FEC block before the checksum packet generator could complete checksum generation for that block.

This variation in FEC processing delay produces jitter in the recovered data stream that must be smoothed out by adding input packet buffering at the receiver. However, such input buffering to recover from VBR FEC-induced jitter adds to the overall stream latency. Thus as a further limitation of fixed-percentage FEC, large variations in stream packet rate as a result of VBR encoding result in long system latency.

Even when the bit rate is constant, as with Constant Bit Rate (CBR) coding, conventional FEC can introduce large amounts of jitter and latency to a real-time audio or video stream. A common FEC technique for protecting against large contiguous burst drops is interleaving. An example of interleaving is found in the Pro-MPEG Forum's Code of Practice #3 standard for FEC for video over IP networks (Ref. #1). One implementation of interleaving writes packets sequentially along rows of a two-dimensional matrix. When a data packet fills the last data row of the matrix, the FEC engine computes a final checksum row, generating one parity packet for each column to fill the checksum row, and then sends the entire checksum row as a burst of parity packets. (Parity packets are computed by calculating the Exclusive-OR across corresponding bits of all packets of a block.)

At a transmitter, interleaving delays the generation of checksum packets until the interleaving matrix has been filled, where it then creates a burst of checksum packets. The receiver inputs an incoming stream as blocks of data packets followed by this burst of checksum packets. At the receiver, interleaving introduces a processing delay equal to the time required to fill the entire receiver's matrix. The receiver waits for the last data and parity packet within a block to arrive before it applies the received parity packets to the received block of data packets to recover any missing packets. (If the last packet in a block was lost, then either a timeout, the appearance of a packet from a following block, or a combination of both may force FEC immediate processing for the current FEC block.) Thus, interleaving introduces processing jitter both at the transmitter and at the receiver as a result of the periodic processing time in waiting to fill the interleave matrix.

Video and Audio Stream Compression

The Motion Picture Experts Group (MPEG), a working group of the International Organization for Standardization (ISO), has defined a set of compression specifications for the efficient coding of audio and video digital streams. The generations of this video compression and encoding standard are known as MPEG-1, MPEG-2, and MPEG-4, with MPEG-4 being the latest member of this family of standards.

MPEG video compression encodes video as a sequence of two main types of frames: key interval snapshots, called I-Frames, and motion difference increments encoded in one of two ways, called B- or P-Frames, depending upon whether they encode motion differences using future and past frames (Bi-directional) or only past frames (Predictive). For efficient compression I-Frames typically occur infrequently, ranging from once every 500 milliseconds for professional broadcast applications to several seconds for Internet video conferencing applications, while a fixed pattern of B- and P-Frames (called Group of Pictures, or GOP) would fill the gap between I-Frames. This succession of I, B, and P video frames occurs at the video frame rate, typically having a constant 33.3 millisecond interval between frames. I-Frames are generally much larger than B- or P-Frames, often by orders of magnitude, as they have to encode all the detail of the basic compressed snapshot picture that the motion B- and P-Frames use as a base. For example, an I-Frame may typically consist of a dozen or more 1,500 byte Internet Protocol (IP) packets, while a typical B or P Frame often resides in a single packet or just a few packets.

The loss of a single packet of an I-Frame may invalidate an entire I-Frame, or at minimum result in severe macro blocking unless some form of error concealment is implemented. The invalidation of an entire I-Frame would be equivalent to the loss of all the packets comprising that I-Frame. Assuming that all packets have the same probability of being lost or corrupted during transport over a congested packet-switched medium, such as the Internet, the larger size of an I-Frame relative to B and P Frames makes I-Frames relatively more susceptible to loss or corruption. Conversely, since B- and P-Frames generally fit within a relatively few number of packets, the probability of losing a B- or P-Frame is substantially less. Even if the I-Frame were not completely invalidated, macro blocking may appear that could persist until the next I-Frame.

Furthermore, loss of a single I-Frame may disrupt a video stream for several seconds, until receipt of the next I-Frame. This occurs because the B- and P-Frames that follow an I-Frame must build upon that last I-Frame. In contrast, the loss of a single B-Frame may result in a disruption as low as a single frame period, about 33 milliseconds, since it may depend only on the P-Frames on either side of it. P-Frames only rely on the preceding I- or P-Frame. These facts further emphasize the importance of protecting I-Frames, relative to recovering lost B or P Frames.

Recent research in video forward error correction has validated the conclusion that I-Frames deserve the most FEC protection. A paper titled, "A Model for MPEG with Forward Error Correction and TCP Friendly Bandwidth," published by the ACM in the NOSSDAV '03 Conference (Ref. #2), analyzed the effectiveness of varying the Group of Pictures (GOP) MPEG coding parameter and varying the number of FEC packets for each type of frame (I, P, & B) on the playable frame rate for the recovered video stream. They adopted an underlying constraint of an upper limit on throughput to make such video streams friendly to other network usage. Thus in their tests, increasing FEC overhead cut directly into bandwidth allotted for video, and therefore reduced the playable frame rate, just as lost packets would reduce the number of delivered frames and also lower playable frame rate at the receiver. Thus, they were able to compute an optimal level of FEC that maximized the playable received video frame rate under various packet loss levels.

After an exhaustive analysis of all reasonable combinations of GOP parameters and FEC overhead for the 3 frame types, they found that varying GOP had little effect on the playable frame rate. Not surprisingly, they also determined that FEC was most effective when I-Frames had the most FEC coverage, followed by the P-Frames. In their calculations of optimal FEC coverage for maximizing playable video frame rate, they provided no FEC coverage to B-Frames in simulations where the network packet loss rate was 5% and less, and only provided one FEC checksum packet for B-Frames at all higher network loss probabilities. In general, their FEC optimizations provided about half the FEC protection for P-Frames as provided for I-Frames.

Their analysis was not meant to provide, nor did it teach, an FEC implementation for general video streams, but rather to show that FEC can indeed improve the received playable video frame rate under the assumption of limited bandwidth.

They only optimized FEC for a single high bit rate of video stream and allocated a fixed pattern of FEC coverage to that stream, based upon the ratio of I, P, and B-Frames of their high-bit-rate model stream. In fact, for video conferencing applications and other applications where a single packet may hold B or P Frames, their allocations would result in wasteful FEC allocations. For example, allocating one FEC packet for each B-Frame would result in 100% FEC overhead for B-Frames, even though, in their own analysis, the loss of B-Frames least affects the playable video rate.

Furthermore, their predetermination of FEC overhead would be extremely inefficient when using variable bit rate (VBR) video compression. As we previously mentioned, VBR produces the most efficient video compression, and is therefore the type of compression that all commercial DVDs use today. In VBR, the size of the various video frames changes significantly throughout the stream. Thus any preallocation of FEC for various compression frame types results in very inefficient and widely variable FEC coverage.

Neither this paper, nor any other work with which we are familiar discusses FEC techniques that limit the latency under VBR streams, where the receiver would have to wait for a variable number of packets before it can apply FEC checksum packets to restore a stream. This work also does not address the addition of audio packets to the stream.

Audio uses a completely different encoding mechanism from video. For both video conferencing and video streaming applications, audio is often encoded with a high degree of compression. For speech, compressed bit rates typically range from 8,000 or 11,025 bits per second. Furthermore, audio packetized for IP networks often contain 1,000 to 1,500 bytes of compressed audio signal. At a real-time streaming bit rate of 8,000 bps, the loss of a single audio packet represents a second or more of sound loss. MP3 compression of high-fidelity audio often produces audio streams as low as 56 Kbps. The loss of a single 1,500 byte MP3 audio packet would cause a playout gap of over 200 milliseconds. Thus, at these high compression rates and because of the relatively large amount of sound contained in each packet, even a single dropped audio packet can result in very pronounced audio disruptions at a receiver. Thus in addition to I-Frames, the loss of even a single audio packet could be noticeable, and therefore audio packets also require a high degree of protection.

BRIEF SUMMARY OF THE INVENTION

Embodiments of the invention apply forward error correction methods to audio, video, and other real-time signal streams to enable their robust, low-latency transport over packet-switched networks. To minimize and bound latency and jitter added by FEC, embodiments of the invention may bound the size of an FEC data block to a fixed number of audio and video frames. Because frame rates for audio and video streams are constant, limiting the number of frames places a temporal constraint on FEC-induced jitter and latency. This allows embodiments of the invention to transport both constant bit rate streams (CBR) as well as variable bit rate (VBR) streams.

In some embodiments, the allocation of FEC checksum packets may vary with content to best insure the full playable audio and video frame rates despite network packet loss. Embodiments of the invention may therefore separate packets by content type and place each set of packets of a given content type into its own FEC block for independent FEC coverage.

Embodiments of the invention may use a Galois Field FEC to generate checksum packets. Using a Galois Field FEC allows any subset of K packets from a total FEC block of N packets having N-K checksum packets to recover all the data packets within that FEC block. Because Galois Field FEC protects any N-K data packets, it can also handle a consecutive burst of data packet loss, and may thereby eliminate the need for interleaving data packets within a block.

BRIEF DESCRIPTION OF THE DRAWINGS

FIG. 3. Packet header diagrams for one embodiment of the invention where media packets are encapsulated in UDP/IP packets.

FIG. 5. Two diagrams showing an example of the resulting packet order from one embodiment of the invention. FIG. 5b shows the packetized contents or the audio and video queues of FIG. 5a along with the appropriate interspersed checksum packets.

DETAILED DESCRIPTION OF THE INVENTION

FIGS. 1 through 5 show how one embodiment of the invention applies forward error correction methods to components of audio, video, and other real-time signal streams to enable robust, low-latency transport over packet-switched networks. To minimize and bound latency and jitter added by FEC processing, embodiments of the invention may group together packets carrying like content into the same FEC block and limit the size of an FEC data block to a fixed number of audio and video frames. Because the frame rates for audio and video streams are constant, limiting the number of frames in an FEC block places a temporal constraint on FEC-induced jitter and latency. Since FEC block size is now variable and determined by a time metric and not just a packet count, this constraint allows embodiments of the invention to transport both variable bit rate streams as well as constant bit rate streams with a limit on the maximum latency.

Figure 1:
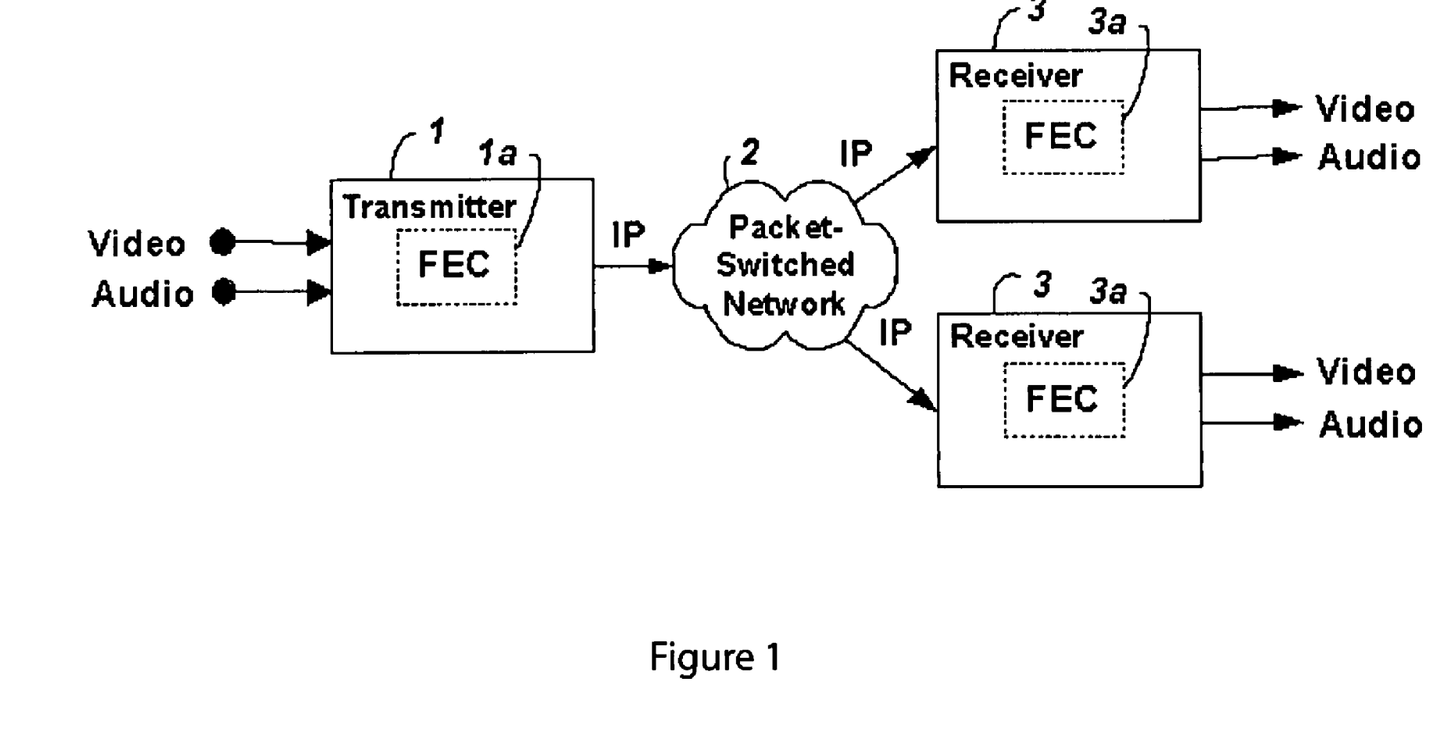
FIG. 1. System diagram showing a transmitting node multicasting FEC-encoded audio and video via the Internet to two independent receiving nodes.
Figure 2:
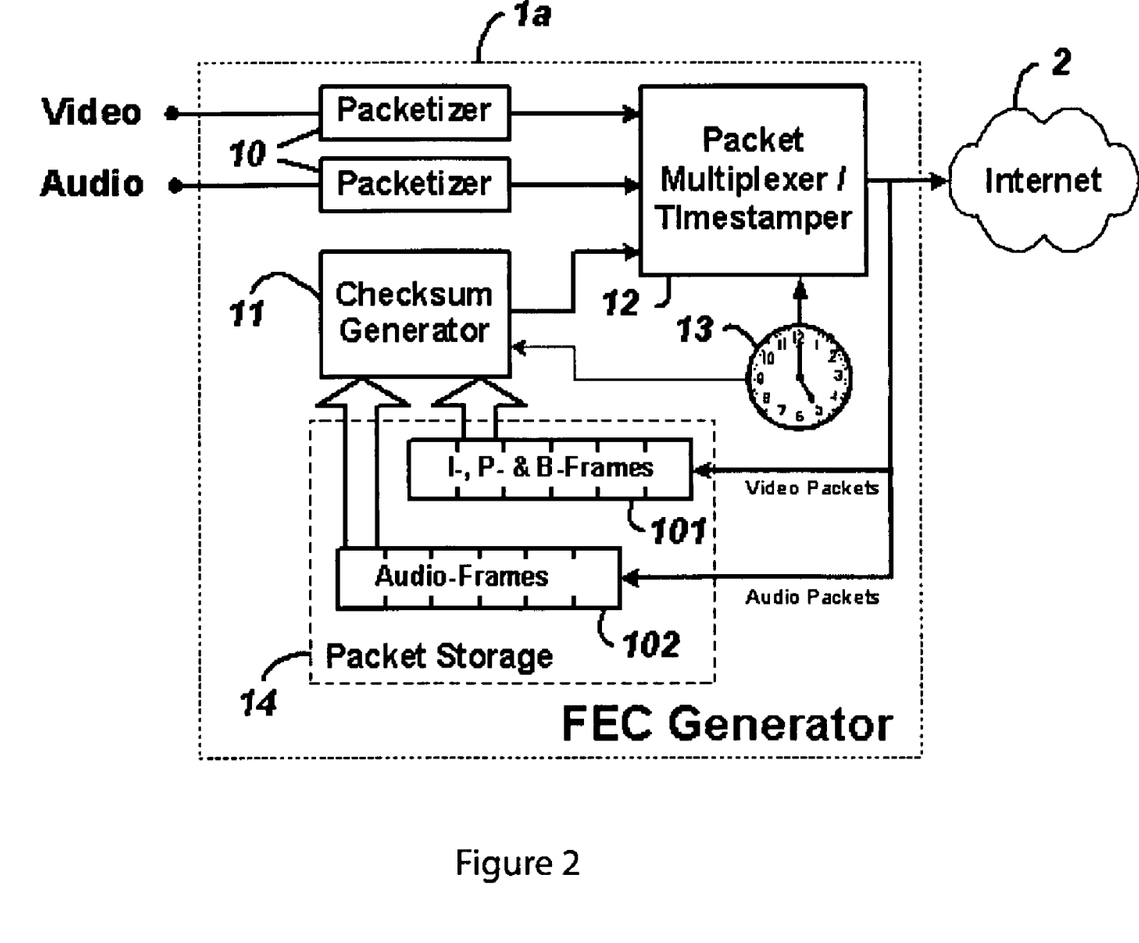
FIG. 2. Block diagram of one embodiment of a content-sensitive FEC checksum packet generator at a transmitting node that uses a local clock to limit the time duration of FEC blocks.

In one embodiment of the invention as shown in FIG. 2, the allocation of FEC checksum packets may vary with content to best insure the full playable audio and video frame rates despite network packet loss. Packetizer 10 in this embodiment breaks apart video and audio frames into packets and adds an RTP and FEC header as shown in FIGS. 3a through 3c, marking the packet with the frame type, sequence number and other information for later identification and recovery.

Figure 3A:
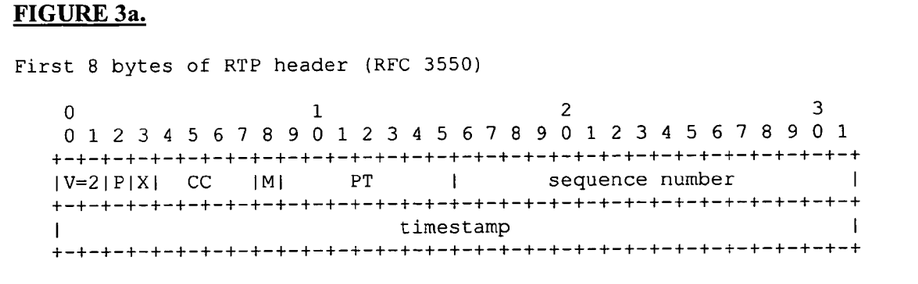
FIG. 3a shows first 8 bytes an RTP packet header for an RTP media packet encapsulated within the UDP packet payload.
Figure 3B:
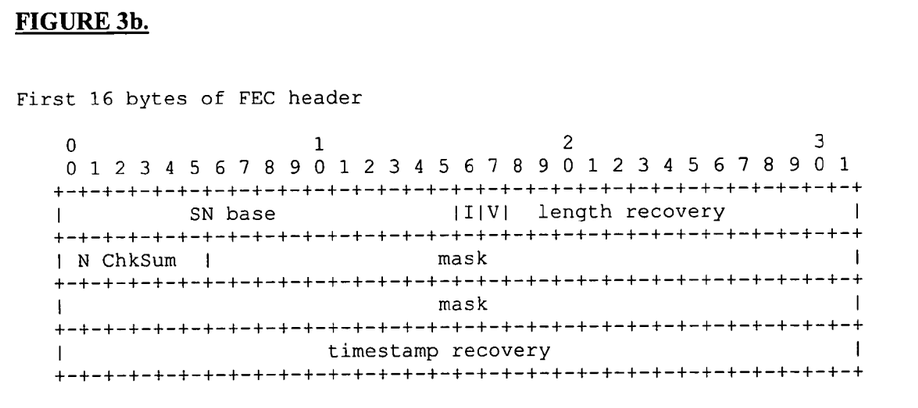
FIG. 3b shows first 16 bytes of an FEC header embedded within the RTP packet payload.
Figure 3C:
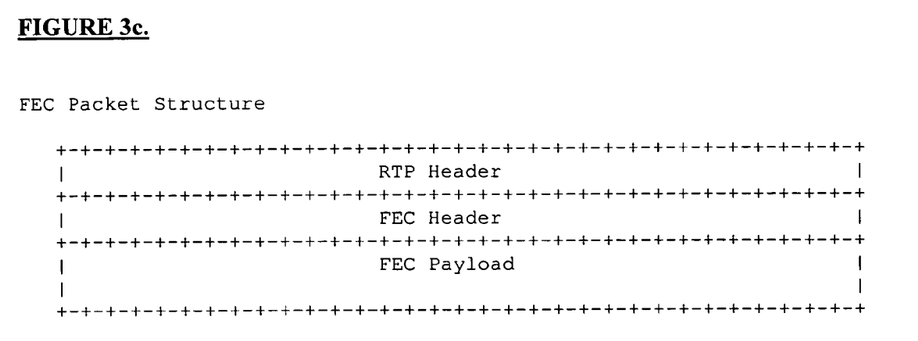
FIG. 3c shows a general packet structure having an RTP header followed by an FEC header and the FEC payload.

FIG. 3a shows the first 8 bytes of an RTP packet header as specified by RFC 3550 (Ref. #3), and includes a packet type field along with sequence number and timestamp fields. In one embodiment of the invention, checksum packets are given a particular packet type, separate from audio or video packet types, and these checksum packets would be given a particular form of FEC header. One possible format for such an FEC header is presented in FIG. 3b. As shown in FIG. 3c, these checksum packets would contain an RTP header that would contain the FEC header along with the FEC checksum payload.

In FIG. 2, a packet multiplexer and timestamp block 12 combines the audio and video packets from packetizer 10 with their associated checksum packets from checksum generator 11 into a media stream for network transport, and then time-stamps these media stream packets with the current time from local clock 13. Just prior to time stamping and after packet multiplexing, some embodiments may also include a packet pacer within block 12 to even out inter-packet release times of media packets into the network to eliminate transmission packet jitter.

A packet storage block 14 sorts packets by type and places each set of packets of a given content type into its own queue. In one embodiment as shown in FIG. 2, queue 101 holds video packets and queue 102 holds packets belonging to the audio frames. Each queue accumulates packets for an FEC block for processing by FEC checksum generator 11. Local source clock 13 helps checksum generator 11 flush processing for each FEC block and forces checksum generation for that block when a latency constraint expires, in order to limit the time spanned by any particular FEC block. An alternative embodiment could simply count frames and omit the need for a local clock to gate FEC block accumulation, provided that the frames represent a constant time interval.

Embodiments of the invention may use Galois Field FEC to generate checksum packets as part of checksum packet generator 11. Using Galois Field FEC allows any subset of size K packets from a total FEC block of N packets having N-K checksum packets to recover all the data packets within that FEC block. Because Galois Field FEC protects any N-K data packets, it can also handle a consecutive burst of packet loss, and may thereby eliminate the need for interleaving data packets within a block. A paper titled, "Effective Erasure Codes for Reliable Computer Communications Protocols," by Luigi Rizzo (Ref #4), provides computer code examples and explains in detail how to implement Galois Field forward error correction. For the details on implementation of Galois Field FEC for embodiments of the invention, we refer the reader to this work. However, we also note that another embodiment of the invention may instead use simple parity FEC—taking the parity across all corresponding bits of all packets within a block.

Packet grouping may vary among embodiments. Some content types may be combined in applications where separate and concentrated coverage of a particular content type is not a requirement. The determination of how to group packets of the same frames or content type would depend upon reliability versus efficiency tradeoffs. In one embodiment of the invention as shown in FIG. 2, checksum generator 11 groups each I-Frame into a single FEC block and generates checksum packets covering that single I-Frame. Likewise, this embodiment may group together P- and B-Frames into an FEC block or alternatively, process each P-Frame and each B-Frame into separate FEC blocks. In this embodiment and as shown in the example of FIG. 5 (as explained later), queue 102 collects three audio frames to form a single FEC block in order to limit FEC processing latency to 100 milliseconds (or any other programmable time interval). Alternative implementations may use additional queues for grouping together each packet type or group together a different number of frames as part of the same FEC block, depending upon latency and robustness considerations.

In general, since degradation in received audio-video signal quality is most affected by losses in audio and I-Frame packets, many embodiments would more heavily weigh FEC protection on these packet types over other packet types. Also, because frame timing for audio is usually separate from video frame timing, embodiments of the invention as shown in FIG. 2 may keep audio and I-Frames in separate queues and not combine such packet types within an FEC block. Also, because a single I-Frame generally contains many packets, yet represent a single 33.3 millisecond time segment, packets belonging to the same I-Frame may comprise the a single FEC block. This is the case in an embodiment of the invention that is shown by the example of FIG. 5.

An upper bound on the number of frames each FEC block may hold limits the jitter and latency of FEC processing. A constraint on the number of checksum packets as a percentage of each packet type constrains the FEC overhead, yet different limits for different packet types allows a weighting on the FEC coverage based upon packet type and allows more sensitive content and packet types to be given more robust FEC coverage.

Figure 4:
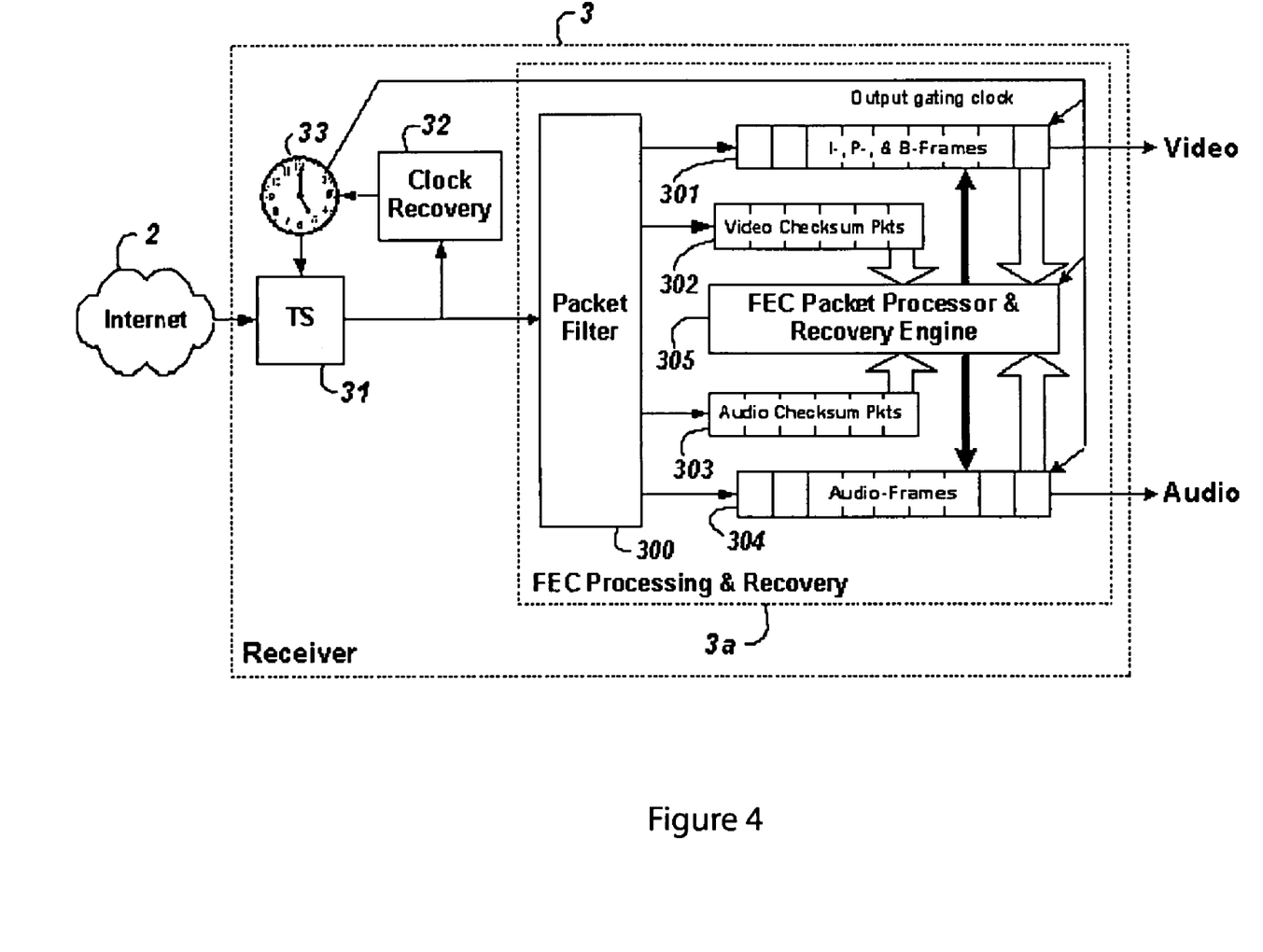
FIG. 4. Block diagram of one embodiment the invention showing a content-sensitive FEC decoder at a receiving node using a recovered local clock to control and minimize latency. In this embodiment a packet filter sorts incoming packets into one of 4 queues, 1 each for audio and video packets and 2 for checksum packets. An FEC packet processor and recovery engine reads FEC blocks from these queues and inserts recovered packets into the appropriate audio or video queue. A recovered local clock removes jitter in the output audio and video streams by gating the audio and video output queues.

At a receiver, the embodiment of FEC processing and recovery block 3a of FIG. 4 provides corresponding audio and video queues to the content filtering and packet segregation in FEC generator 1a. FEC processing and recovery 3a contains video packet queue 301 and video checksum packet queue 302 to aggregate packets belonging to a particular FEC video block as generated by video packet queue 101 of packet storage 14 and checksum generator 11 in FEC generator 1a of transmitter 1. Likewise, audio checksum packet queue 303 and audio frame queue 304 in FEC processing and recovery block 3a of receiver 3 correspond to audio frame queue 102 of packet storage 14. Packet filter 300 in receiver 3 performs essentially the same function as content filtering of packet storage block 14 in FEC generator 1a in identifying and aggregating packets into queues 101 and 102 by content type.

The actual FEC processing of FEC packet processor and recovery engine 305 performs separate FEC processing and recovery on each of the blocks of packets in queues 301 and 302, and queues 303 and 304. FEC processing of 305 should be compatible with the checksum packet generator 11 in transmitter 1. Thus if checksum generator 11 uses Galois Field FEC checksum packets, so should FEC processor 305. The output of FEC processing and recovery block 3a is the recovered audio and video packet streams, with missing packets restored to the extent of the ability of the FEC processing 305, and FEC processing jitter removed by output gating from clock 33 on queue 301 and 304.

In the embodiment shown in FIG. 4, Receiver 3a includes clock 33 synchronized to a remote clock 13 by means of clock recovery mechanism 32. Here, the purpose of clock 33 and clock recovery 32 is to provide a timeout measurement for FEC packet processor and recovery engine 305 when aggregating FEC packet blocks and their constituent frames, and also for jitter removal on the output audio and video streams as described above. However clock 33 of a receiver 3 need not be precisely synchronized to clock 13 of transmitter 1. Embodiments of the invention may omit clock recovery mechanism 32, particularly when the free-running frequency of clock 33 is substantially close to the frequency of clock 13 in transmitter 1. Thus even without clock recovery 32, clock 33 may be adequate to measure frame times for the purpose of determining FEC blocks and as a timeout when packets are late or lost. It may also be adequate for gating output queues 301 and 304 to reduce FEC block jitter, particularly if coupled with a mechanism to alleviate situations where queues 301 and 304 become full due to clock mismatch.

Figure 5A:
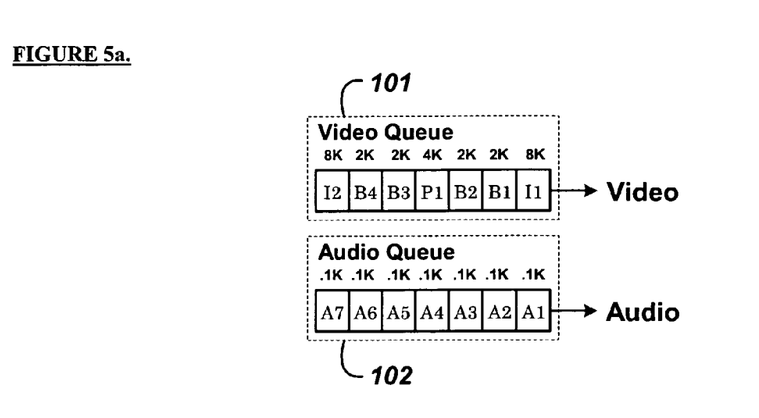
FIG. 5a provides an example packet content of the audio and video queues, showing I, P, and B Frames in a video queue and audio frames in an audio queue.
Figure 5B:
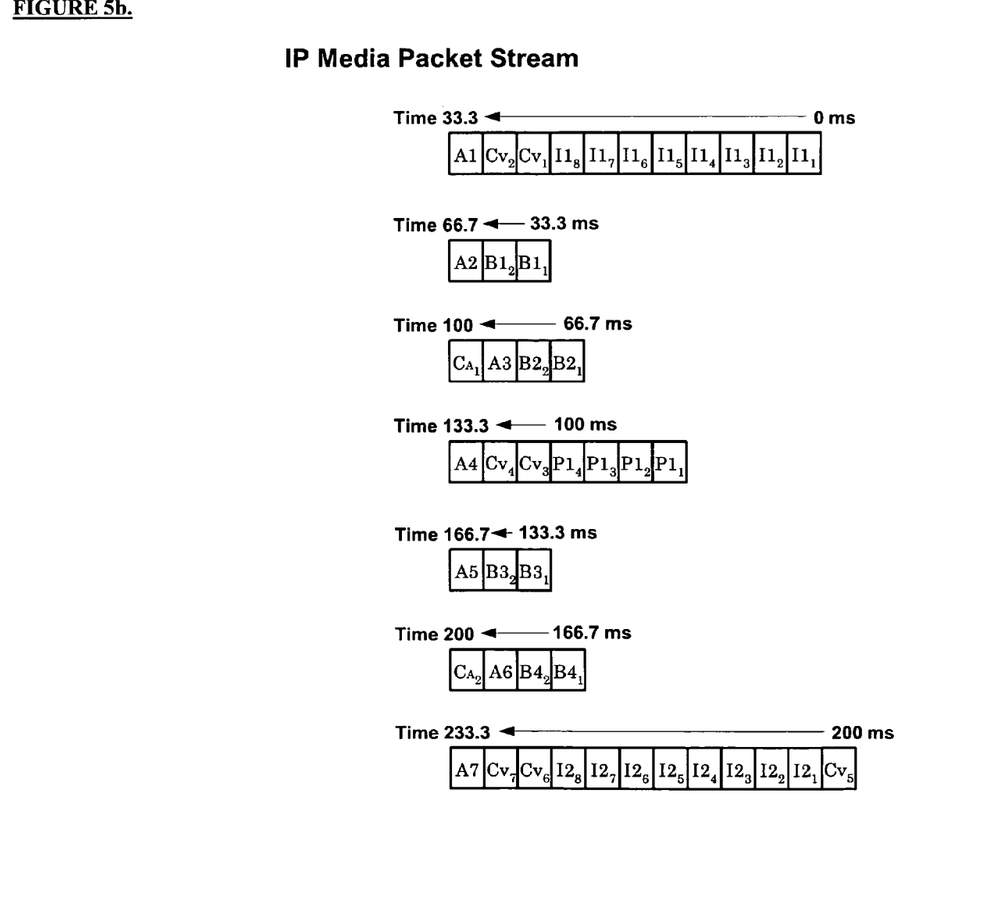
FIG. 5b provides an example of packet ordering for the first 233.3 milliseconds of an audio-video packet stream.

FIGS. 5a and 5b provide an example of the media stream packet ordering, packet timing, and FEC block grouping of the invention under one embodiment of the invention. In this example, we assume an implementation that: 1) maintains the original packet ordering; 2) constrains I-Frames to have their own FEC block; 3) attempts to keep the coverage duration of an FEC block at 100 milliseconds or three frames periods; 4) keeps audio packets separate from video packets in FEC blocks; and 5) maintains a minimum overall FEC overhead of 25%. We further assume that each video frame larger than 1,500 bytes will be split into IP packets with a payload size of 1,000 bytes or less.

The second constraint that keeps I-Frames in the same block takes precedence over the 100-millisecond (third) constraint on latency, so I-Frame FEC blocks only cover a single video frame period. This provides maximum protection for I-Frames. FEC blocks that come after an I-Frame FEC block may contain a mixture of B and P frames up to the 100-millisecond limit. The 100-millisecond rule takes precedence over the overhead rule to allow larger blocks and therefore more robust FEC recovery. To honor the first two constraints on maintaining packet ordering and keeping I-Frames together in an FEC block may sometimes force the flushing of an FEC block and generation of that block's checksum packets before the latency or overhead constraints are met. Thus, the actual FEC checksum overhead may be slightly higher than the number specified as a constraint.

As shown in video queue 101 of FIG. 5a, the size of a first I-Frame, I1, is 8,000 bytes. For this example, video packetizer 10 of FIG. 2 would packetize frame I1 into 8 IP packets, each holding 1,000 payload bytes. These I-Frame packets are represented as $I1_1$ through $I1_8$ in FIG. 5b. Similarly, FIG. 5 shows 2,000-byte B-Frame B1 as two packets, $B1_1$ and $B1_2$, and 4,000-byte P-Frame P1 as four packets, $P1_1$ through $P1_4$. In this example, each audio packet is 0.1 Kbytes in size and holds one audio frame.

In FIG. 5b, during the first frame from the start of the stream through the first 33.3 milliseconds, the stream contains a single FEC block containing the first I-Frame, packets $I1_1$ through $I1_8$ plus checksum packets $Cv_1$ and $Cv_2$ for this frame, along with an audio packet, A1, for the first audio frame. Two checksum packets are generated for this I-Frame because the I-Frame is 8 packets and FEC overhead is 25%.

During the next frame time, from 33.3 milliseconds into the stream to time 66.7 milliseconds, the stream contains the two packets for the first B-Frame, B1 (second video frame), and the second audio frame, A1. Because we wish to limit the time span of an FEC block to 100 milliseconds or three frames of data per FEC block, and aggregate audio packets into their own FEC block, separate from FEC blocks containing video packets, we must wait until the third audio frame is sent, after 66.7 milliseconds, before sending out the first audio checksum packet, $CA_1$, as part of the audio FEC block comprising audio packets A1 through A3. Thus at time 66.7 milliseconds through 100 milliseconds, the stream contains the second B-Frame (third video frame), the third audio frame packet, A3, and the first audio checksum packet, signaling the end of the first audio FEC block. Since less than 100 milliseconds have accumulated since transmission of the previous FEC block, the FEC block that includes the B1 and B2 frames is not yet ready, but waits for the next frame before generating checksum packets.

The first P-Frame (fourth video frame) occurs after 100 milliseconds and contains 4 packets, $P1_1$ through $P1_4$. At this point in time, video packet queue 101 in FEC generator 14 has accumulated 8 video packets. These three video frames, B1, B2, and P1, represent 100 milliseconds of video data, the time constraint dictates the closing of the current FEC block and the generation of 2 checksum packets, $Cv_3$ and $Cv_4$, for this block of 8 packets with FEC overhead of 25%.

Because audio packets comprise separate FEC blocks from video packet in this embodiment, the next audio FEC block and its corresponding checksum packet $CA_2$ occur after transmission of the sixth audio packet, A6, after 166.7 milliseconds. By the time 200 milliseconds elapses, two new video frames, B3 and B4, comprising 4 packets, have been transmitted—an insufficient number of frames to complete another video FEC block.

After 200 milliseconds the second I-Frame (seventh video frame), I2 comprising 8 packets, enters video queue 101 in FEC generator 1a. However, since this embodiment of the invention keeps I-Frames together as a single FEC block, the checksum generator 11 flushes the video FEC block comprising B3 and B4 to produce checksum packet $Cv_5$ since to wait any longer would violate the constraints on maintaining packet order and keeping a maximum of 100-milliseconds of latency. Immediately after transmission of the eight packets of I2, checksum generator 11 creates the 2 FEC checksum packets, $Cv_6$ and $Cv_7$, for the I2 FEC block.

The above packet processing helps to preserve the quality of the received media stream, despite the possible introduction of significant network impairments, such as that which is likely to occur over an unconditioned best-effort packet network, such as the Internet. The application of FEC adds to the media stream's throughput requirement. However, because the latency constraint overrides the overhead constraint, the actual additional throughput overhead for FEC varies and may sometimes exceed the specified FEC overhead.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of embodiments of the invention. For example, the packet ordering and grouping of the media packet stream flow diagrams of FIG. 5 may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

REFERENCES (1) P. Elmer, "Pro-MPEG Forum code of Practice #3 Transmission of Professional MPEG-2 transport streams over IP networks," URL: http://www.pro-mpeg.org/publicdocs/pdf/Vid-on-IP-CoP3-issue1.pdf, Pro-MPEG Forum, WAN Group, Mar. 4, 2003.

(2) H. Wu, M. Claypool, and R. Kinicki, "A Model for MPEG with Forward Error Correction and TCP-Friendly Bandwidth," NOSSDAV '03, Jun. 1-3, 2003, Monterey, Calif., ACM.

(3) H. Schulzrinne et. al., "RTP: A Transport Protocol for Real-Time Applications," URL: http://www.ietf.org/rfc/rfc3550.txt?number=3550, Network Working Group of the Internet Engineering Task Force (IETF), The Internet Society, July 1993.

(4) Luigi Rizzo, "Effective Erasure Codes for Reliable Computer Communications," ACM Computer Communication Review, Vol. 27, No. 2, April 1997, pp. 24-36.

The invention claimed is:

1. A system for low-latency content-sensitive forward error correction comprising:
  a network;
  a first node selected from a group of nodes wherein said first node is coupled with said network and wherein said first node comprises:
    at least one packetizer;
    a checksum generator;
    a forward error correction module coupled with said checksum generator;
    a time clock to time stamp a first packet and a second packet wherein said time clock is coupled with said checksum generator;
    a packet multiplexer timestamper module coupled with said at least one packetizer and further coupled with said time clock and further coupled with said checksum generator and further coupled with said forward error correction module;
    said packet multiplexer timestamper module configured to filter packets based on a first packet type for processing by said forward error correction module and wherein said packet multiplexer timestamper is configured to transmit checksum packets based on a time obtained from said time clock;
  a plurality of second nodes selected from said group of nodes wherein said plurality of second nodes are coupled with said network and wherein said plurality of second nodes comprises:
    a receiver timestamper;
    a receiver time clock coupled with said receiver timestamper;
    a forward error correction processing and recovery module coupled with said timestamper comprising a packet filter coupled with at least one packet queue and at least one checksum queue wherein said forward error correction processing and recovery module further comprises a forward error correction engine coupled with said at least one packet queue and said at least one checksum queue;
    said forward error correction engine configured to output received packets in correct order with minimal latency; and,
  said first node configured to transmit to said plurality of said second nodes.

2. The system of claim 1 further comprising an audio packetizer selected from said at least one packetizer and a video packetizer selected from said at least one packetizer.

3. The system of claim 1 wherein said first packet comprises video data and said second packet comprises audio data.

4. The system of claim 1 wherein said checksum generator comprises a Galois Field forward error corrector.

5. The system of claim 1 wherein said checksum generator comprises a parity forward error corrector.

6. The system of claim 1 wherein said checksum generator is configured to produce a percentage of checksum packets based on a packet type associated with said first packet.

7. The system of claim 1 wherein said first node comprises a network enabled computing device.

8. The system of claim 7 wherein said network enabled computing device comprises a video conference server.

9. The system of claim 7 wherein said network enabled computing device comprises a real-time video streaming server.

10. The system of claim 7 wherein said network enabled computing device comprises a live video streaming server.

11. The system of claim 7 wherein said network enabled computing device comprises a laptop, a personal computer, a personal digital assistant or a cell phone.

12. A method for low-latency content-sensitive forward error correction comprising:
  packetizing data into a first packet in a first node selected from a group of nodes wherein said first node is coupled with a network;
  packetizing data into a second packet in said first node;
  time stamping said first packet in said first node;
  time stamping said second packet in said first node;
  generating a checksum packet based on said first packet and said second packet based on a packet type of said first packet and said second packet;
  transmitting said first packet and said second packet and said checksum packet over said network;
  providing software to a plurality of second nodes selected from said group of nodes wherein said plurality of second nodes are coupled with said network and wherein said plurality of second nodes are configured to forward error correct data sent from said first node wherein said software comprises the steps of:
    filtering a first received packet and a second received packet into a packet queue and a checksum queue based on a packet type associated with said first received packet and a second packet type associated with said second received packet;
    reconstructing a missing packet and placing said missing packet in correct time order in said packet queue; and,
    outputting said first received packet, said second received packet and said missing packet in a corrected order with minimal latency.

13. The method of claim 12 wherein said packetizing data into said first packet comprises packetizing video data.

14. The method of claim 12 wherein said packetizing data into said second packet comprises packetizing audio data.

15. The method of claim 12 wherein said packetizing data into said first packet and packetizing data into said second packet comprises packetizing data into a single queue comprising audio and video data.

16. The method of claim 12 further comprising holding said first packet, said second packet and said checksum packet for predetermined output packet release times.

17. The method of claim 12 wherein said generating said checksum packet occurs as a percentage of transmitted packets based on a packet type associated with said first packet.

18. The method of claim 12 wherein said generating said checksum packet occurs based on a time threshold to minimize latency.

19. A system for low-latency content-sensitive forward error correction comprising:

means for packetizing data into a first packet in a first node selected from a group of nodes wherein
said first node is coupled with a network;
means for packetizing data into a second packet in said first node;
means for time stamping said first packet in said first node;
means for time stamping said second packet in said first node;
means for generating a checksum packet based on said first packet and said second packet;
means for transmitting said first packet and said second packet and said checksum packet over said network;
means for providing software to a plurality of second nodes selected from said group of nodes wherein said plurality of second nodes are coupled with said network and wherein said plurality of second nodes are configured to forward error correct data sent from said first node wherein said software comprises the steps of:

means for filtering a first received packet and a second received packet into a packet queue and a checksum queue based on a packet type associated with said first received packet and a second packet type associated with said second received packet;
means for reconstructing a missing packet and placing said missing packet in correct time order in said packet queue; and,
means for outputting said first received packet, said second received packet and said missing packet in a corrected order with minimal latency.

20. The system of claim 19 wherein said means for generating said checksum packet utilizes a time clock for limiting the number of packets utilized in constructing a checksum packet to minimize latency.

\* \* \* \* \*